(Model.)
H. BINNS.
APPARATUS FOR MOLDING SCREWS.
No. 249,140. Patented Nov. 1, 1881.
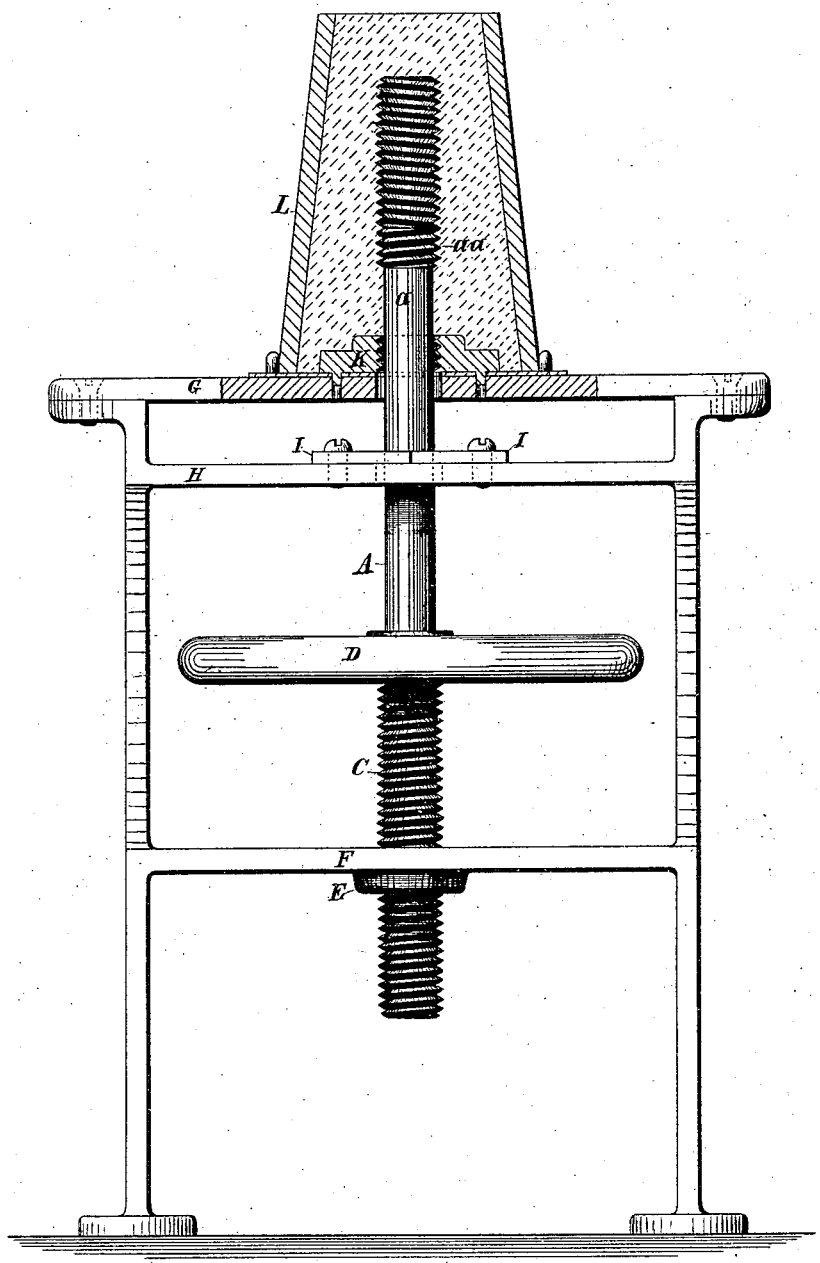
Witnesses.
Conrad C. Ellery
James H. Bucklin
Inventor.
Henry Binns

United States Patent Office.

HENRY BINNS, OF PROVIDENCE, RHODE ISLAND, ASSIGNOR OF ONE-HALF TO I. TALBOT PITMAN, OF SAME PLACE.

APPARATUS FOR MOLDING SCREWS.

SPECIFICATION forming part of Letters Patent No. 249,140, dated November 1, 1881.

Application filed April 9, 1881. (Model.)

*To all whom it may concern:*

Be it known that I, HENRY BINNS, of the city and county of Providence, and State of Rhode Island, have invented certain Improvements in an Apparatus for Molding Screws, of which the following is a specification.

The invention relates to the construction of the pattern-rod and to the manner of using the pattern in and withdrawing it from the flask with a uniform movement.

In the process of casting screws in a mold formed by twisting the pattern from the sand in which it is packed in the flask it has been difficult to cast one perfectly uniform in spiral thread, line pitch, and diameter when the pattern consisted of an entire screw, and the mold is formed in a whole flask, because in this position it is not easy to pack the sand thoroughly and evenly into every part of the spiral thread, for while the upper surface of the screw could be well packed it would be difficult to reach the under surface and secure the same compactness without changing the position of the immersed pattern; which would require more time and labor. For want of a thorough and compact packing the cast screw is frequently imperfect in the thread. Another cause of imperfection in the mold arises from a deflection or vibration from the true line to which the pattern is liable when withdrawn without the assistance of sufficient modes of guiding and regulating its movement.

To form an upright mold having a perfect and uniform spiral impression and in true line pitch and diameter is the object of this invention, while at the same time to make such mold with less time and labor than is required by other known modes.

In the accompanying drawing, letter A indicates the whole pattern-rod; a, the cylindrical portion of the pattern; a a, the short screw or former; C, the guiding and regulating screw; D, the wheel-lever; E, the nut secured to platform F; G, the work-bench; H, the shelf supporting the plates I I; K, the lower half of the head-pattern; L, the flask.

The following describes the construction of the pattern-rod, the mode, and the arrangement by which it is operated and regulated.

The pattern end of the rod A is made in the form of a cylinder, a, for at least the length of the screw to be cast, and is terminated by a short screw of three or four turns, or former, a a. A screw, C, is constructed on the other end of the rod of the length of the proposed screw, and of the same number of threads to the inch as the former a a. Secured on the rod between the pattern and the screw C is a wheel-lever, D, for the hand, or a pulley for power, by which the rod is rotated. To operate and regulate the movement of this rod, a nut, E, is secured to a platform, F, beneath the bench G. Into this nut the screw C is adjusted to work as the rod is rotated. To prevent any lateral movement of the pattern, two plates, I I, cut concavely, are secured to a shelf, H, and adjusted so as to embrace the cylinder a closely, and prevent it from vibrating while moving.

Over an orifice through the bench G just sufficient in diameter to let the screw a a pass through, the lower half of the head-pattern K, and concentric with it, is placed and secured to its place by pins fitted to holes in the bench. For the purpose of making the impression of the last spiral thread equally perfect with the rest, and also to prevent the sand from falling through, a female screw is formed in pattern K, fitted to screw a a; or, when the purpose is simply to stop the sand, I fit on the top of the pattern K a rubber ring, the inner edges of which the screw a a can easily press aside when going through. Between this pattern K, if made of metal, and the bench I lay a thin sheet of tin a little larger than the area of the flask, pierced with holes corresponding with those in the bench for the pins of K. By this sheet the flask is lifted off; but if the pattern K is of light wood the sheet may be dispensed with, as the sand may suffice to hold it in its place. These adjusted, the rod A is raised by turning the wheel-lever until the pattern attains the proper height. The flask L, in area about six inches square for a two-and-a-half-inch screw, is now placed over the pattern, and the sand filled in from the open top. I now tamp the sand so as to pack it firmly around the cylinder a only up to screw or former a a, and then, reversing the wheel, draw down the former through the tamped sand at least its length. Here the mold is to begin, for whatever cavity is left by the former is filled in onto the top of the former in its last position. This done, I continue the rotation, and drawing down the former, it cuts a well-defined and equal impression the whole distance through the sand thus packed until it passes into the pattern K, and it is stopped as soon as it disappears below the surface of the work-bench. This completes the molding of the screw, and the flask is removed from the bench, and the remainder of the screw-head is molded in the usual way.

In some cases it may be convenient to form the screw-head at the top instead of at the bottom of the flask. If so, the pattern K is reversed and screwed onto the forming-screw, when, the sand being filled in and tamped up to this pattern, the former, descending, is disengaged from it and makes the impression as before.

The foregoing description refers more particularly to casting screws with heads, such as are used in lifting-jacks. In cases where the screw is cast with some other attachment the attachment-pattern is made in a similar manner.

I do not intend to limit myself to the mode of packing the sand with the flask in a vertical position, as in some cases it may be more convenient to lay the flask horizontally, and in such case the arrangement for operating and regulating the pattern-rod must be correspondingly altered to conform to the new position of the rod.

What I claim is—

1. The pattern-rod consisting of the cylinder $a$, the forming-screw $a\ a$, and the guide-screw C, in combination with the stationary nut E, substantially as described.

2. The combination and arrangement of the pattern-rod, consisting of a cylinder, forming-screw, and a regulating-screw operating in a stationary nut, with the bench G and the flask L, and with or without the plates I I, substantially as described.

HENRY BINNS.

Witnesses:
CONRAD C. ELLERY,
JAMES A. BUCKLIN.